United States Patent
Verhoog

[11] Patent Number: 5,885,732
[45] Date of Patent: Mar. 23, 1999

[54] ONE-PIECE LEAK-PROOF BATTERY

[75] Inventor: Roelof Verhoog, Bordeaux, France

[73] Assignee: SAFT, Romainville, France

[21] Appl. No.: 905,201

[22] Filed: Aug. 1, 1997

[30] Foreign Application Priority Data

Aug. 5, 1996 [FR] France .................................. 96 09868

[51] Int. Cl.⁶ .................................................. H01M 2/02
[52] U.S. Cl. .......................... 429/176; 429/120; 429/223; 429/175
[58] Field of Search .................................. 429/176, 175, 429/120, 223

[56] References Cited

U.S. PATENT DOCUMENTS 5,066,555  11/1991  Tamminen .

FOREIGN PATENT DOCUMENTS 06659663  8/1995  European Pat. Off. .
0692838A1  1/1996  European Pat. Off. .
736916    10/1996  European Pat. Off. .

OTHER PUBLICATIONS

Patent Abstracts of Japan, vol. 013, No. 383 (E–811), 24 Aug. 1989, corresponding to JP 01 134874 A (Showa Denko, KK) dated 26 May 1989.

*Primary Examiner*—John S. Maples
*Attorney, Agent, or Firm*—Sughrue, Mion, Zinn, Macpeak & Seas, PLLC

[57] ABSTRACT

The casing of a leak-proof one-piece battery is made of a material comprising a mixture of at least a matrix based on polypropylene and an alloy of a polyamide and a polypropylene. The ratio of the matrix to the alloy is in the range 0.5 to 6 by weight. The alloy forms elongate arborescent inclusions in the matrix such that, on average, the largest dimension of a segment of the arborescence is at least twenty times the smallest dimension of the segment.

20 Claims, 2 Drawing Sheets

ONE-PIECE LEAK-PROOF BATTERY

BACKGROUND OF THE INVENTION

1. Field of the Invention

The present invention concerns a one-piece leak-proof battery. A one-piece storage battery has a single casing which is prismatic in shape comprising chambers separated by walls in which the elements of the storage battery are placed. Such batteries generally have capacities which are in the range 10 Ah to 250 Ah.

2. Description of the Prior Art

"Leak-proof" type valve storage batteries do not allow gas exchange with the surroundings under normal operation. Until now, the majority of leak-proof type batteries have principally been intended for incorporation into portable devices. They are thus small and of limited capacity ($\leq 10$ Ah). In order to protect the user against any over-pressure, they are preferably cylindrical in shape and the casing is normally metal. Such a casing is expensive and heavy, limiting the energy per unit mass of the battery.

Recently, the demand for batteries with a greater capacity and a higher energy per unit weight has grown. Batteries with the best characteristics are prismatic in shape and have a polymeric material casing. A "one-piece" battery is of great benefit from this viewpoint. Sealing is then a problem, however, in particular when there is a moderate internal over-pressure. A principal condition for sealing a battery is the intrinsic impermeability to liquids and gases of the material constituting the casing.

Loss of part of the electrolyte or of water or of the organic solvent forming the electrolyte base causes an inevitable reduction in battery performance. As an example, if the material used to form the casing is not impermeable to both oxygen and hydrogen, this results in a loss of water, and thus a reduction in battery life, but if the material is only permeable to one of these gases, the operating profile of the battery becomes unbalanced.

The first batteries of the above type had a polypropylene (PP) casing and were used in railroad applications in particular. Their gas permeability has been found to be unsatisfactory.

A battery casing intended particularly for aviation applications has been produced from polyamide 11 (PA11) with chemical formula ($-NH-(CH_2)_{10}-CO-)_n$ obtained by polycondensation of amino-undecanoic acid. However, while its impermeability to gas is better than that of PP, PA absorbs liquids, in particular water and glycol. Further, that material is expensive and raises a resource problem because of its plant origin (castor bean).

When the battery is provided with a cooling system circulating a heat transfer liquid along the walls of the battery, absorption of moisture by the material of the box can cause a loss of electrical insulation between the electrochemical assembly and the cooling liquid. If the electrical insulation reaches a low value, the battery user may be endangered.

The aim of the present invention is to propose a leak-proof one-piece battery with improved liquid and gas impermeability. More particularly, the invention proposes a one-piece battery with a gas permeability of less than 10% of the gas permeability of PP.

SUMMARY OF THE INVENTION

The invention consists in a one-piece leak-proof battery the casing of which is composed of at least two pieces of a thermoplastics material comprising a mixture including at least:

a matrix which is selected from a polypropylene, a copolymer of propylene and ethylene, and a polypropylene grafted with an ethylene radical; and an alloy of polymers comprising:

a proportion of 50% or more by weight of the alloy of a first polymer which is a polyamide selected from a polyamide 6, a polyamide 6—6, and a copolymer of polyamide 6 and polyamide 6—6; and a proportion of 50% or less by weight of the alloy of a second polymer selected from a polypropylene, a copolymer of propylene and ethylene, and a polypropylene grafted with an ethylene radical, and a compatibilizer, The ratio of the matrix to the alloy is in the range 0.5 to 6 by weight and the alloy forms arborescent inclusions of elongate shape in the matrix such that on average the largest dimension of a segment of the arborescences is at least equal to twenty times the smallest dimension of the segment.

The material of the casing comprises an alloy of polymers which is defined as a mixture of at least two mutually incompatible polymers to which a compatibilizer has been added to confer the required homogeneity on the mixture. The compatibilizer ensures coupling between the polyamide and the polypropylene, generally due to the propylene and amide groups which it carries.

The matrix is selected from a polypropylene —($-CH_2-CH(CH_3)-)_n-$, an alternating or a block copolymer of polyethylene and polypropylene, and a polymer with a principal polypropylene chain onto which ethylene radicals are grafted.

The proportion of the matrix is preferably in the range 40% to 85% by weight of the mixture.

The alloy comprises a first polymer containing polypropylene and a second polymer which is a polyamide selected from a polyamide 6, a polyamide 6—6, and an alternating or block polyamide copolymer, these polyamides optionally being grafted.

Polyamide 6 (polyaminocaprolactame) has the chemical formula ($-NH-(CH_2)_5-CO-)_n$. It is obtained by reacting caproic acid with hexamethylenediamine. When used alone this material exhibits large dimensional variations in the presence of moisture.

Polyamide 6—6 has chemical formula ($-NH-(CH_2)_6-NH-CO-(CH_2)_4-CO-)_n$. It is obtained by reacting adipic acid with hexamethylenediamine.

Preferably, the proportion of the alloy is in the range 15% to 60% by weight of the mixture.

The ratio of the weight M of the matrix to the weight A of the alloy is such that: $0.5 \leq M/A \leq 6$.

In a transmission electron microscope, this mixture appears as a dispersion of the alloy in the matrix. The alloy is in the form of elongate inclusions in the shape of lenses or sticks which may be branched, each stick representing a segment of the arborescence. The length L must be very much greater than the thickness e of the sticks and the average of these measurements must lead to a ratio $L/e \geq 20$. These inclusions form a discontinuous network of the alloy in the matrix.

Preferably, the largest dimension of the inclusions is in the range 5 $\mu$m to 50 $\mu$m (5 $\mu m \leq L \leq 50$ $\mu$m), and the smallest dimension is in the range 0.1 $\mu$m to 2.5 $\mu$m (0.1 $\mu m \leq e \leq 2.5$ $\mu$m).

The proportion of the compatibilizer is at least 10% by weight of the alloy. The presence of the compatibilizer is essential for the production of the alloy but its proportion C must remain small relative to the composition of the alloy: $0\% < C \leq 10\%$.

In one embodiment, the matrix is a copolymer selected from alternating copolymers and block copolymers of propylene and ethylene.

In a further embodiment, the matrix is a polypropylene grafted with an ethylene radical, the degree of grafting being in the range 5% to 16% by weight of the matrix.

The matrix is preferably a polypropylene grafted with an ethylene radical, the degree of grafting being 8%, and the alloy comprises a polyamide 6.

In a first preferred embodiment, the proportion of the matrix is 80% by weight of the mixture.

In a second preferred embodiment, the proportion of the matrix is 60% by weight of the mixture.

The material can also contain additives which are not electrical conductors to improve its mechanical properties. In a particular embodiment, the material also comprises an additive selected from glass fibers and a mineral filler such as silica or clay, the proportion of the matrix being at least equal to 30% by weight of the material. It is essential that polypropylene is the major polymer in the material to ensure continuity of the material and to guarantee that it is impervious to liquids.

The leak resistance of the casing of a battery also depends on the leak resistance of the seals between the different parts of which it is composed, of course. For the batteries of the invention, the seals between the parts of the casing are formed by heat sealing. Heat sealing can be carried out by contact or by heat radiation. Other sealing methods are less reliable, such as gluing, or are unsuitable for parts with complex shapes, such as ultra-sound sealing, for example.

Preferably, the casing parts are contact heat sealed. The parts making up the casing are formed by pressure injecting the molten material. The lateral wall thickness of the casing is generally in the range 1.5 mm to 3 mm. The parts obtained are then contact heat sealed. This technique consists of preheating the two surfaces to be sealed by direct contact with a heating tool until they soften, then pushing them together immediately after withdrawing the heating tool. Heat transfer between the tool and the part is thus by deep conduction. The time between heating and application of the assembling pressure must be as short as possible to prevent the molten polymer surface from cooling. The heating tool generally contains electrical resistors (heating mirror) and it is provided with a temperature regulator. The combination of the two characteristics of the intrinsic impermeability and the contact heat sealability of the material is the best means of achieving a satisfactory seal of the casing, for a long service life of the battery.

In a variant, the battery comprises a means for cooling by circulating a heat transfer liquid along the walls of the casing. This means can be that described in French patent No. 2 697 678, for example.

In a first embodiment, the battery of the invention is a one-piece alkaline electrolyte battery comprising five to fifty chambers containing nickel-metal hydride storage cell elements.

In a second embodiment, the battery of the invention is a one-piece alkaline electrolyte battery comprising five to fifty chambers containing nickel-cadmium storage cell elements.

The material of the present invention has the advantage of being chemically inert towards the alkaline electrolytes used, which principally contain at least one alkaline hydroxide such as potassium hydroxide KOH, sodium hydroxide NaOH or lithium hydroxide LiOH, but also other additives such as surfactants.

In a third embodiment, the battery of the invention is a one-piece organic electrolyte battery containing lithium storage cell elements. The material of the invention is also resistant to the organic solvents constituting the base for non-aqueous electrolytes.

The casing of the invention has the further advantages of being a good electrical insulator, of having good dimensional stability in the presence of moisture, of being shock resistant and of resisting temperatures up to 100° C. Further, this material is light (density $\leq 1.03$ g/cm$^3$), easy to shape on an industrial scale, in particular by injection molding, and is moderately priced.

Such a battery is particularly suitable for use as an energy source in an automotive vehicle. The material of the casing has the advantage of being chemically insensitive to the various fluids present, such as brake fluid.

The invention will be better understood and its other advantages and features will become apparent from the following non-limiting description, which refers to the accompanying drawings.

DETAILED DESCRIPTION OF THE PREFERRED EMBODIMENTS

Figure 1:
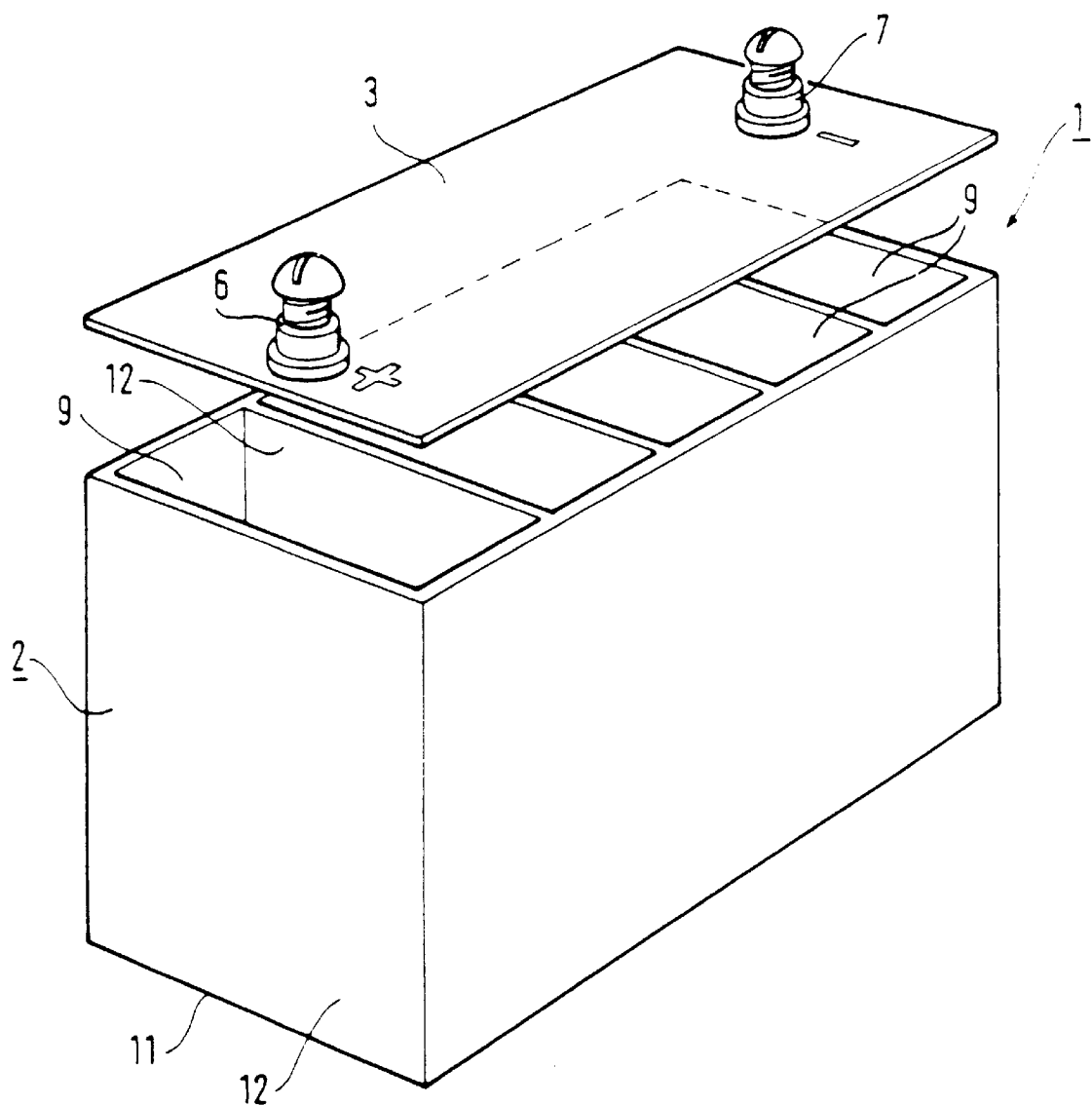
FIG. 1 shows a one-piece storage battery of the present invention containing five chambers.
Figure 2:
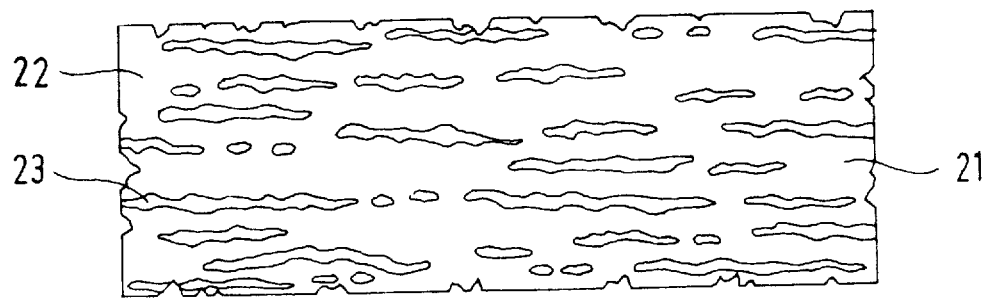
FIG. 2 is a cross-section of the wall of a battery casing in accordance with the present invention using electron microscopy to show the material structure.
Figure 3:
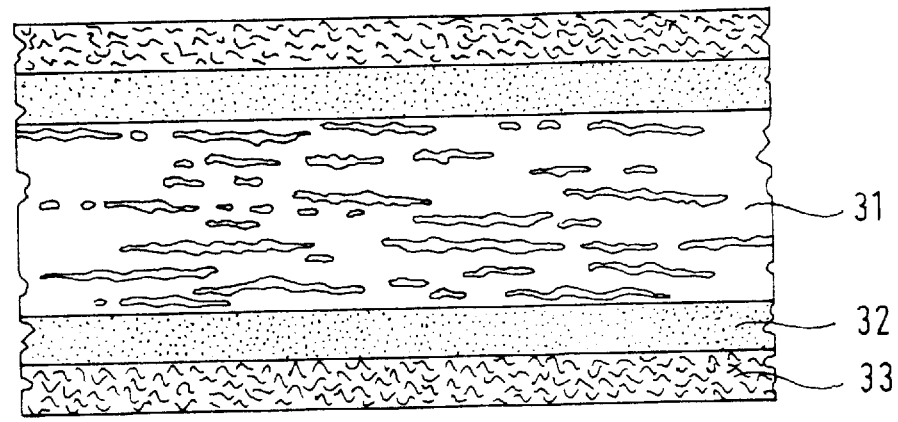
FIG. 3 is analogous to FIG. 2 for a material which does not fall within the scope of the invention.

FIG. 1 shows a one-piece storage battery of the present invention with a capacity of 120 Ah and a voltage of 6 V. It comprises a casing 1 composed of a box 2 and a cover 3. Cover 3 has a positive terminal 6 and a negative terminal 7. The box comprises longitudinal walls 5, a bottom 11 and lateral walls 12 with a thickness of about 2 mm. The storage cell elements are located in five chambers 9 delimited by lateral walls 12.

Parts 2 and 3 forming casing 1 are formed by pressure injection molding of molten material at a temperature which is in the range 240° C. to 290° C. These parts are then assembled by direct contact heat sealing. They are first brought into contact with the surface of the heating tool. The tool is then withdrawn and the molten zones are pressed together.

The one-piece batteries of the invention are always provided with retaining straps during use. In the present case, the mechanical strength of the material is thus not a critical parameter.

Five one-piece battery casings I through V were made. Casing I was of polypropylene. Casings II through V were of a material comprising a mixture of a matrix and an alloy in different proportions shown in the table below.

The matrix was a polypropylene grafted with 8% by weight of ethylene sold by HOECHST under the trade name "PPT 1052". The alloy comprised polypropylene and polyamide 6; it is sold by ATOCHEM under the trade name "RS 6000". It contained about 60% of polyamide 6, 37% of polypropylene and 3% of compatibilizer.

The gas permeability was evaluated using a hydrotest to measure the hydrogen permeability. The hydrogen permeability was measured at a relative pressure of 1 bar. The test was carried out on a closed casing comprising a box and a heat-sealed cover. The casing was filled with hydrogen and a vacuum was formed outside it. A spectrometer was used to measure the quantity of hydrogen which escaped from the casing.

The permeability to liquids was estimated by measuring the electrical insulation of a box filled with electrolyte (aqueous 8.7N KOH solution) and standing in a mixture of equal volumes of water and ethyleneglycol, normally used as a cooling liquid. The test was carried out using a dielectric tester with one of its electrodes immersed in the electrolyte and the other in the cooling liquid.

The bending modulus was measured using a sample in a tensile test machine and a method known in itself.

The results obtained are shown in the following table.

TABLE

| Ref | Composition matrix % | Composition alloy % | M/A | Permeability to $H_2$ $cm^3/m^2 \cdot 24$ h | Insulation $m\Omega$ | Bending modulus MPa |
|-----|------|------|------|---------|---------|------|
| I   | 100  | 0    | —    | 200 000 | ∞ after 120 h | 1 050 |
| II  | 80   | 20   | 4    | 17 600  | ∞ after 340 h | 1 054 |
| III | 70   | 30   | 2.33 | 17 600  | ∞ after 120 h | 1 065 |
| IV  | 60   | 40   | 1.50 | 13 600  | ∞ after 120 h | 1 060 |
| V   | 30   | 70   | 0.43 | 4 800   | 460 after 120 h | 1 350 |

Observation of a section through a sample of the materials of casings II through IV showed a homogeneous structure 21 constituted by a matrix 22 containing inclusions 23 of more or less elongate shape along their axis with respect to the section plane.

In contrast, the same observation carried out for the material of casing V showed three distinct zones: a high porosity central portion 31 which corresponded to a high concentration of polyamide, a denser portion 32 about 100 $\mu$m thick either side of central portion 31, and finally an outer portion 33 of very porous fibrous structure with a thickness of about 100 $\mu$m.

The present invention is not limited to the embodiments described, of course, but can be varied by the skilled person without departing from the spirit and scope of the invention. In particular, the composition can be varied within the indicated ranges without departing from the spirit and scope of the invention.

There is claimed:

1. A one-piece leak-proof battery, the casing of which is composed of at least two pieces of a thermoplastics material comprising a mixture including at least:
   a matrix which is selected from the group consisting of a polypropylene, a copolymer of propylene and ethylene, and a polypropylene grafted with an ethylene radical;
   an alloy of polymers comprising a proportion of 50% or more by weight of the alloy of a first polymer which is a polyamide selected from the group consisting of polyamide 6, polyamide 6—6, and a copolymer of polyamide 6 and polyamide 6—6, and a proportion of 50% or less by weight of the alloy of a second polymer selected from the group consisting of a polypropylene, a copolymer of propylene and ethylene, and a polypropylene grafted with an ethylene radical; and
   a compatibilizer,
   the ratio of said matrix to said alloy being in the range 0.5 to 6 by weight and said alloy forming arborescent inclusions of elongate shape in said matrix such that on average the largest dimension of a segment of said arborescences is at least equal to twenty times the smallest dimension of said segment.

2. The battery claimed in claim 1 wherein the proportion of said matrix is in the range 40% to 85% by weight of said mixture.

3. The battery claimed in claim 1 wherein the proportion of said alloy is in the range 15% to 60% by weight of said mixture.

4. The battery claimed in claim 1 wherein said largest dimension of said inclusions is in the range 5 $\mu$m to 50 $\mu$m and said smallest dimension is in the range 0.1 $\mu$m to 2.5 $\mu$m.

5. The battery claimed in claim 1 wherein the proportion of said compatibilizer is at most 10% by weight of said alloy.

6. The battery claimed in claim 1 wherein said matrix is a copolymer selected from alternating copolymers and block copolymers of propylene and ethylene.

7. The battery claimed in claim 1 wherein said matrix is a graft polypropylene grafted with an ethylene radical, the degree of grafting being in the range 5% to 16% by weight of said matrix.

8. The battery claimed in claim 7 wherein said matrix is a polypropylene grafted with an ethylene radical, the degree of grafting being 8%, and said alloy comprises polyamide 6.

9. The battery claimed in claim 8 wherein the proportion of said matrix is 80% by weight of said mixture.

10. The battery claimed in claim 8 wherein the proportion of said matrix is 60% by weight of said mixture.

11. The battery claimed in claim 1 wherein said material further comprises an additive selected from glass fibers and a mineral filler, the proportion of said matrix being at least 30% by weight of said material.

12. The battery claimed in claim 1 wherein said two pieces of said casing are contact heat sealed.

13. The battery claimed in claim 1 further comprising cooling means for circulating a heat transfer liquid along the walls of said casing.

14. The battery claimed in claim 1 further comprising five to fifty chambers containing elements of nickel-metal hydride storage cells.

15. The battery claimed in claim 1 further comprising five to fifty chambers containing elements of nickel-cadmium cells.

16. The battery claimed in claim 1 further comprising elements of lithium storage cells.

17. A one-piece leak-proof battery, the casing of which is composed of a thermoplastics material comprising a mixture including at least:
   a matrix which is selected from the group consisting of a polypropylene, a copolymer of propylene and ethylene, and a polypropylene grafted with an ethylene radical;
   an alloy of polymers comprising a proportion of 50% or more by weight of the alloy of a first polymer which is a polyamide selected from the group consisting of polyamide 6, polyamide 6—6, and a copolymer of polyamide 6 and polyamide 6—6, and a proportion of 50% or less by weight of the alloy of a second polymer selected from the group consisting of a polypropylene, a copolymer of propylene and ethylene, and a polypropylene grafted with an ethylene radical; and
   a compatibilizer.

18. The battery claimed in claim 17 wherein the ratio of said matrix to said alloy is in the range 0.5 to 6 by weight.

19. The battery claimed in claim 18 wherein said alloy forms arborescent inclusions of elongate shape in said matrix such that on average the largest dimension of a segment of said arborescences is at least equal to twenty times the smallest dimension of said segment.

20. The battery claimed in claim 17 wherein said alloy forms arborescent inclusions of elongate shape in said matrix such that on average the largest dimension of a segment of said arborescences is at least equal to twenty times the smallest dimension of said segment.

* * * * *

UNITED STATES PATENT AND TRADEMARK OFFICE
CERTIFICATE OF CORRECTION

PATENT NO. : 5,885,732
DATED : March 23, 1999
INVENTOR(S) : Roelof VERHOOG

It is certified that error appears in the above-indentified patent and that said Letters Patent is hereby corrected as shown below:

Column 1, after the "Title of the Invention", but before the "Background of the Invention", insert --The Government of the United States of America has rights in this invention pursuant to Cooperative Agreement No. DE-FC02-91CE50336 awarded by the U.S. Department of Energy--.

Signed and Sealed this

Twentieth Day of March, 2001

Attest:

NICHOLAS P. GODICI

Attesting Officer

Acting Director of the United States Patent and Trademark Office